(12) United States Patent
Zheng et al.

(10) Patent No.: US 10,956,783 B2
(45) Date of Patent: Mar. 23, 2021

(54) IMAGE PROCESSING METHOD AND APPARATUS

(71) Applicant: TENCENT TECHNOLOGY (SHENZHEN) COMPANY LIMITED, Guangdong (CN)

(72) Inventors: Yong Sen Zheng, Shenzhen (CN); Kai Ning Huang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 45 days.

(21) Appl. No.: 16/356,346

(22) Filed: Mar. 18, 2019

(65) Prior Publication Data
US 2019/0213444 A1  Jul. 11, 2019

Related U.S. Application Data

(63) Continuation of application No. PCT/CN2017/114568, filed on Dec. 5, 2017.

(30) Foreign Application Priority Data

Dec. 21, 2016 (CN) .......................... 201611191518.3

(51) Int. Cl.
| | |
|---|---|
| *G06K 9/62* | (2006.01) |
| *G06K 9/46* | (2006.01) |
| *G06N 3/08* | (2006.01) |
| *G06K 9/00* | (2006.01) |
| *G06T 11/00* | (2006.01) |
| *G06K 9/32* | (2006.01) |
| *G06T 3/40* | (2006.01) |

(52) U.S. Cl.
CPC ....... *G06K 9/6256* (2013.01); *G06K 9/00228* (2013.01); *G06K 9/3233* (2013.01);
(Continued)

(58) Field of Classification Search
CPC ............ G06K 9/6256; G06K 9/00228; G06K 9/00711; G06K 9/3233; G06K 9/46;
(Continued)

(56) References Cited

U.S. PATENT DOCUMENTS

| | | | |
|---|---|---|---|
| 9,208,567 B2 | 12/2015 | Solem et al. | |
| 2008/0118153 A1* | 5/2008 | Wu ..................... | G06K 9/00711 382/190 |

(Continued)

FOREIGN PATENT DOCUMENTS

| | | |
|---|---|---|
| CN | 104215584 A | 12/2014 |
| CN | 105528638 A | 4/2016 |

(Continued)

OTHER PUBLICATIONS

International Search Report for PCT/CN2017/114568 dated Feb. 27, 2018 [PCT/ISA/210].

(Continued)

*Primary Examiner* — Jinggee Wu
(74) *Attorney, Agent, or Firm* — Sughrue Mion, PLLC

(57) ABSTRACT

An image processing method and apparatus, and a computer readable medium are provided. The method includes obtaining an image. The image is processed using a preset training model that is a function relationship model of a feature sample image and an activation function of the feature sample image. The feature sample image includes an image satisfying an image feature value extraction condition. A target image is obtained that corresponds to the image according to a processing result of the preset training model.

20 Claims, 20 Drawing Sheets

(52) U.S. Cl.
CPC ............. *G06K 9/46* (2013.01); *G06K 9/4628*
(2013.01); *G06K 9/4647* (2013.01); *G06K*
*9/6202* (2013.01); *G06N 3/08* (2013.01);
*G06T 3/4046* (2013.01); *G06T 11/00*
(2013.01)

(58) Field of Classification Search
CPC ...... G06K 9/4628; G06K 9/4647; G06N 3/08;
G06N 3/088; G06N 3/0454; G06T 11/00;
G06T 11/001; G06T 11/60; G06T 3/4046
See application file for complete search history.

(56) References Cited

U.S. PATENT DOCUMENTS

| | | | |
|---|---|---|---|
| 2013/0188837 A1* | 7/2013 | Takahashi | G06T 7/74 |
| | | | 382/103 |
| 2015/0278710 A1* | 10/2015 | Hisada | G06N 20/00 |
| | | | 706/12 |
| 2016/0267329 A1* | 9/2016 | Fan | G07G 1/009 |
| 2016/0267359 A1* | 9/2016 | Gan | G06K 9/6223 |
| 2018/0165554 A1* | 6/2018 | Zhang | G06K 9/6256 |
| 2019/0244270 A1* | 8/2019 | Kim | G06F 16/3331 |

FOREIGN PATENT DOCUMENTS

| | | |
|---|---|---|
| CN | 105809704 A | 7/2016 |
| CN | 106204467 A | 12/2016 |

OTHER PUBLICATIONS

Office Action dated Nov. 19, 2020 in Chinese Application No. 201611191518.3.

\* cited by examiner

Select a target region of interest

Template of the target region of interest

Region of interest defining	Activation function-based searching	Iteration optimization

IMAGE PROCESSING METHOD AND APPARATUS

CROSS-REFERENCE TO RELATED APPLICATIONS

This application is a continuation of International Patent Application No. PCT/CN2017/114568 filed on Dec. 5, 2017, which claims priority from Chinese Patent Application No. 201611191518.3, entitled "IMAGE PROCESSING METHOD AND APPARATUS" filed with the Chinese Patent Office on Dec. 21, 2016, the entire contents of each of which are herein incorporated by reference in their entireties.

BACKGROUND

1. Field

This application relates to the field of computer technologies, and specifically to image processing.

2. Description of the Related Art

As image processing technologies become more mature, an ordinary image may be transformed into an artistic effect image of a particular style by performing style transformation. The style transformation may be performed using an artificial intelligence algorithm.

As shown in FIG. 1, style transformation is mainly: performing purification processing on a background of an ordinary image by using an artificial intelligence algorithm of a neural network, and then combining the ordinary image with an artistic style of a painting school, and finally performing intelligent image processing to obtain an artistic effect image.

Currently, a relatively commonly used artificial intelligence algorithm is a style network algorithm. As shown in FIG. 2, by inputting an original image to a trained offline style transformation model, an artistic effect image on which style processing is performed may be quickly obtained. Because relevant parameters in the offline style transformation model are fixed, and some parameters do not affect an overall output result, calculation redundancy and storage space waste are caused. Usually, a solution in which the offline style transformation model is used requires approximately 13-MByte (MB) calculation resources. This size is excessively big for an application program of a mobile terminal, and cannot support coexistence of a plurality of feedforward neural networks.

SUMMARY

It is an aspect to provide an image processing method and apparatus.

According to an aspect of one or more exemplary embodiments, there is provided a method comprising obtaining, by an image processing apparatus, an image; processing, by the image processing apparatus, the image using a preset training model that is a function relationship model of a feature sample image and an activation function of the feature sample image, the feature sample image comprising an image satisfying an image feature value extraction condition; and obtaining, by the image processing apparatus, a target image corresponding to the image according to a processing result of the preset training model.

According to other aspects of one or more exemplary embodiments, there is also provided an apparatus and a computer readable medium consistent with the method.

BRIEF DESCRIPTION OF THE DRAWINGS

Exemplary embodiments will be described below with reference to the drawings, in which.

DETAILED DESCRIPTION

Figure 1:
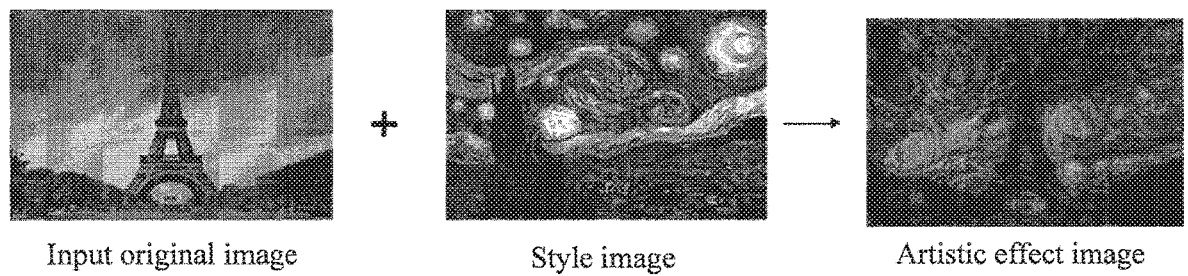
FIG. 1 is a schematic effect diagram of performing style transformation on an image according to an exemplary embodiment.

An example of a style transformation is shown in FIG. 1. As shown in FIG. 1, a style transformation may include performing purification processing on a background of an ordinary image by using an artificial intelligence algorithm of a neural network, and combining the ordinary image with an artistic style of a painting school, and performing intelligent image processing to obtain an artistic effect image.

Figure 2:
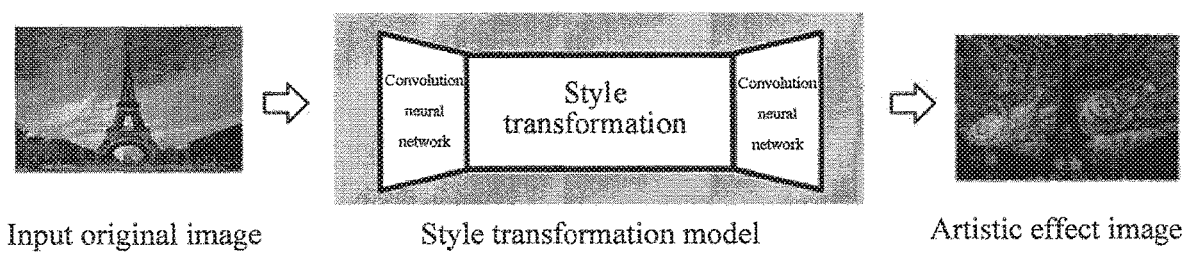
FIG. 2 is a schematic effect diagram of performing style transformation by using a style network algorithm according to the related art.

An example of an artificial intelligence algorithm is a style network algorithm. As shown in FIG. 2, by inputting an original image to a trained offline style transformation model, an artistic effect image on which style processing is performed may be quickly obtained. Because relevant parameters in the offline style transformation model are fixed, and some parameters do not affect an overall output result, calculation redundancy and storage space waste are caused. A solution in which the offline style transformation model is used requires approximately 13-MByte (MB) of calculation resources. This calculation resource size is excessively large for an application program of a mobile terminal, and cannot support coexistence of a plurality of feedforward neural networks.

Exemplary embodiments provide an image processing method and apparatus. According to the method and apparatus, during model training, sample images not satisfying a image feature value extraction condition may be deleted, thereby effectively reducing calculation redundancy and storage space waste. In addition, due to a relatively high compression rate, such a model may be applied to an application program of a mobile terminal, thereby improving utility of the solution.

The exemplary embodiments provide an image processing method. The image processing apparatus obtains the to-be-processed image; processes the to-be-processed image by using the preset training model, the preset training model being the function relationship model of the feature sample image and the activation function of the feature sample image, and the feature sample image including the image satisfying the image feature value extraction condition; the image processing apparatus obtains the target image corresponding to the to-be-processed image according to the processing result of the preset training model. By using the foregoing method, during model training, sample images not satisfying a image feature value extraction condition are deleted, thereby effectively reducing calculation redundancy and storage space waste. In addition, due to a relatively high compression rate, such a model may be applied to an application program of a mobile terminal, thereby improving utility of the solution.

Figure 3:
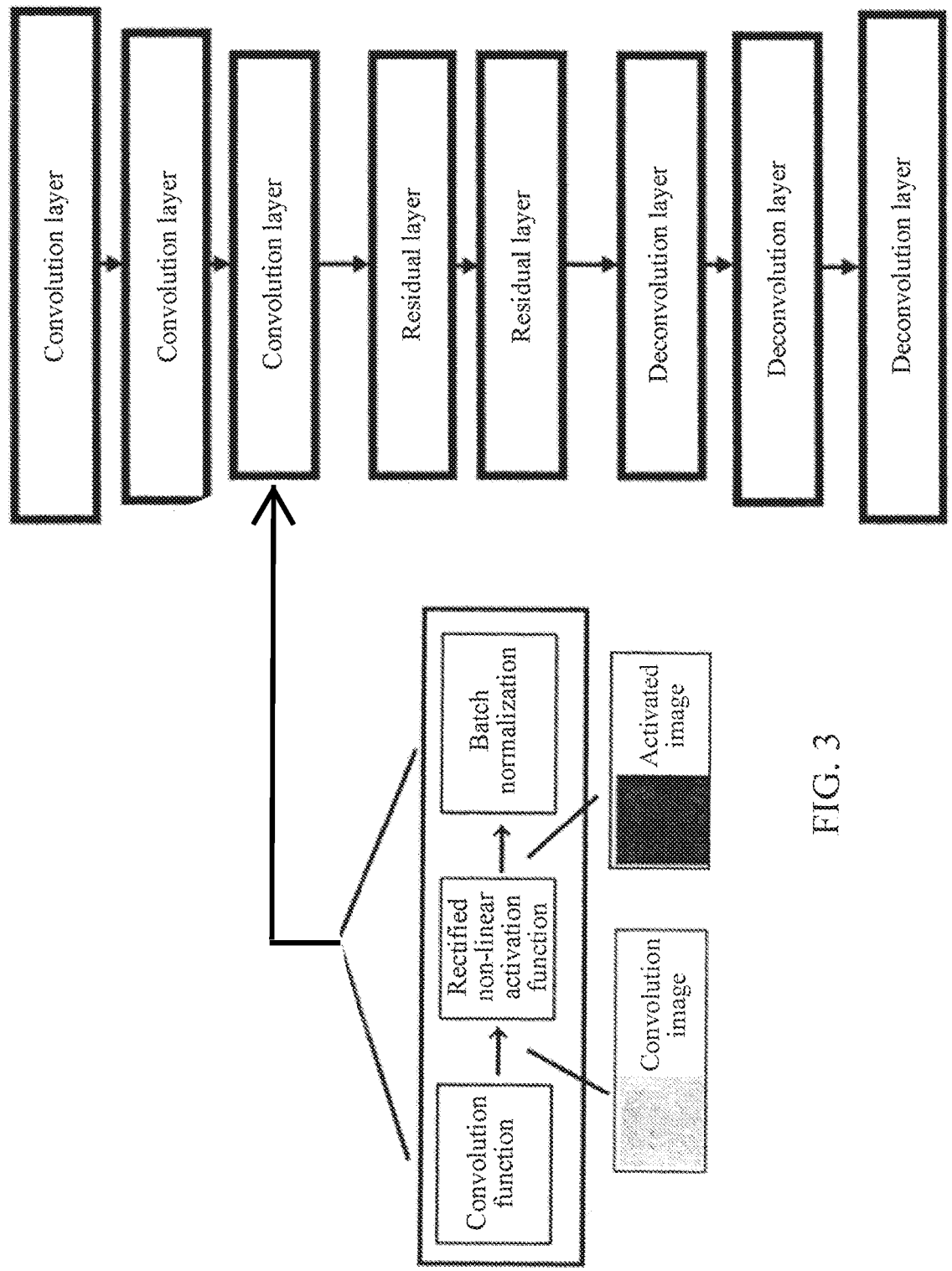
FIG. 3 is a schematic structural diagram of a preset training model according to an exemplary embodiment.

It should be understood that the present disclosure mainly performs purification processing on an image by using an improved preset training model. Referring to FIG. 3, FIG. 3 is a schematic structural diagram of a preset training model according to an exemplary embodiment. Different from a related art offline style transformation model used in a style network algorithm, the preset training model in the present disclosure uses a "323 structure", that is, three convolution layers, two residual layers and three deconvolution layers. In the related art offline style transformation model, there are three convolution layers, five residual layers and three deconvolution layers. Because relevant parameters in the related art model are fixed, and some parameters do not affect an overall output result, calculation redundancy and storage space waste are caused. The preset training model of the present disclosure is, without changing an overall output result, effectively compressed by deleting images not satisfying an image feature value extraction condition, thereby reducing calculation redundancy and storage space occupation. In addition, after being effectively compressed, the preset training model of the present disclosure may usually be less than 1 MB, and may therefore be applied to a mobile terminal conveniently. It should be noted that, in the present disclosure, the use of two residual layers is merely an example. During an actual implementation, a quantity of residual layers may further be changed. For example, three residual layers or four residual layers may be used.

Parameters of the convolution layers may actually be considered as a series of trainable or learnable filters. A neuron on each layer of a convolution neural network is only connected to some regions of an upper layer. In a forward calculation process, image data of a target input image is first input to a trainable filter. The filter performs convolution on the image data, to generate a convolution sample image, and then performs summation, weighting and bias addition processing on pixels of the convolution sample image, and may finally obtain a sample image by using an activation function.

Specifically, convolution (Conv) calculation, rectified non-linear activation function (rectified linear unit, ReLU) calculation and batch normalization (BN) calculation are sequentially performed on the convolution layers. A first feature image is obtained through the Conv calculation. Then, the ReLU calculation is performed on the first feature image, to obtain a second feature image. Compared with the Conv calculation, the ReLU calculation may obtain all valuable activation signals through filtering because of use of the activation function, making analysis easier. The BN calculation may be used when training cannot be performed on the neural network because a convergence speed is very slow, exploding gradients occur, or the like. Moreover, a BN algorithm may also be used in a general case to increase a training speed and improve precision of a model.

The residual layers include information about basic assumption of a model. If a regression model is correct, a residual may be considered as an observed value of an error and should meet an assumption condition of the model and have some characteristics of the error. That rationality of the assumption of the model and data reliability are determined by using information provided by the residual is referred to as residual analysis.

A deconvolution network may be considered as a reverse process of a convolution network and is used for unsupervised learning. However, the deconvolution process is not capable of learning and is only used for visualizing a trained convolution network model, thereby not having a learning and training process. During deconvolution visualization, a feature image obtained from each layer is used as input to perform deconvolution, so that a deconvolution result is obtained. The deconvolution result is used for verifying and displaying the feature image extracted from each layer.

Figure 4:
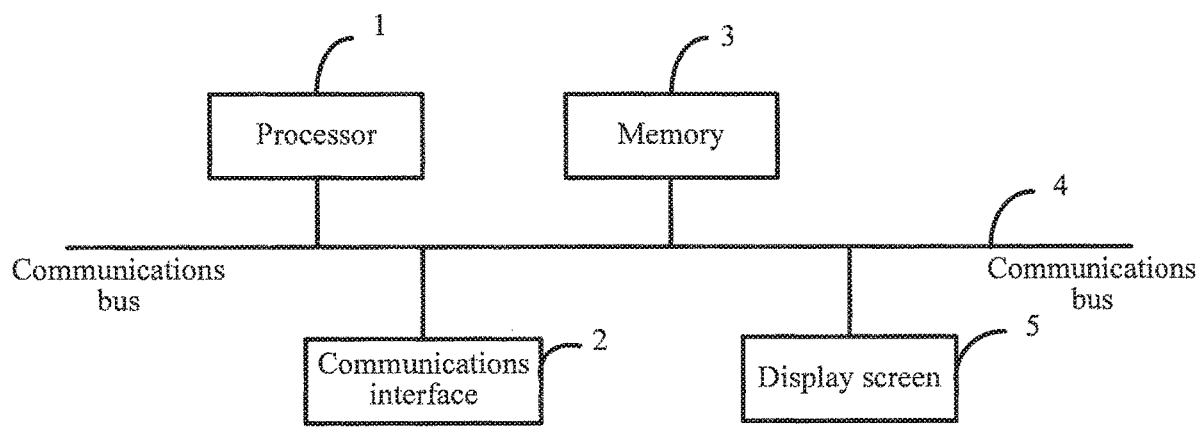
FIG. 4 is a schematic structural diagram of hardware of an image processing apparatus according to an exemplary embodiment.

The image processing method provided in the exemplary embodiments is implemented based on an image processing apparatus. Before the image processing method in this application is described, the image processing apparatus is described. The image processing apparatus may be a device such as a computer, a notebook computer, a tablet computer, or a smartphone. Refer to FIG. 4, FIG. 4 is a schematic structural diagram of hardware of an image processing apparatus according to an exemplary embodiment. As shown in FIG. 4, the image processing apparatus may include:

a processor 1, a communications interface 2, a memory 3, a communications bus 4, and a display screen 5.

Communication among the processor 1, the communications interface 2, the memory 3, and the display screen 5 is implemented through the communications bus 4.

Figure 5:
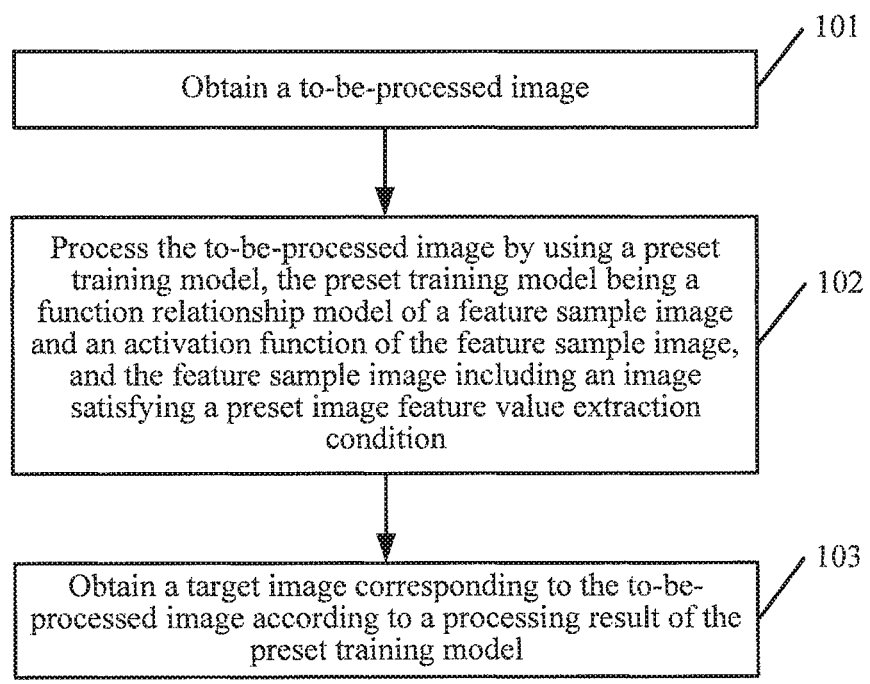
FIG. 5 is a schematic diagram of an image processing method according to an exemplary embodiment.

The image processing method in the present disclosure is described below from the prospective of the image processing apparatus. Referring to FIG. 5, FIG. 5 is a schematic diagram of an image processing method according to an exemplary embodiment. The method includes the following steps:

101: Obtain a to-be-processed image.

In this embodiment, the image processing apparatus first obtains at least one to-be-processed image. The to-be-processed image may be an original image that is input. The image processing apparatus performs purification processing on a background of the input original image, that is, delete noise in the input original image as much as possible.

102: Process the to-be-processed image by using a preset training model, the preset training model being a function relationship model of a feature sample image and an activation function of the feature sample image, and the feature sample image including an image satisfying a preset image feature value extraction condition.

In this embodiment, that the image processing apparatus processes the to-be-processed image by using the preset training model may be specifically inputting the to-be-processed image to a trained preset training model.

The preset training model is actually the function relationship model of the feature sample image and the activation function of the feature sample image. However, the feature sample image is a sample image obtained through screening and satisfies the preset image feature value extraction condition, and not all sample images are used for training. In this way, calculation resources used for performing training are reduced.

103: Obtain a target image corresponding to the to-be-processed image according to a processing result of the preset training model.

In this embodiment, the image processing apparatus obtains the processing result according to the preset training model that is used. The processing result is the target image corresponding to the to-be-processed image. The target image is an image after purification processing is performed and may be combined with another image. Finally, intelligent image processing is performed to obtain an artistic effect image.

In this exemplary embodiment, an image processing method is provided. The image processing apparatus first obtains the to-be-processed image; then, processes the to-be-processed image by using the preset training model, the preset training model being the function relationship model of the feature sample image and the activation function of the feature sample image, and the feature sample image including the image satisfying the preset image feature value extraction condition; finally, the image processing apparatus obtains the target image corresponding to the to-be-processed image according to the processing result of the preset training model. By using the foregoing method, during model training, sample images not satisfying a preset image feature value extraction condition are deleted, thereby effectively reducing calculation redundancy and storage space waste. In addition, due to a relatively high compression rate, such a model may be applied to an application program of a mobile terminal, thereby improving utility of the solution.

Based on the embodiment corresponding to FIG. 5, in a first optional embodiment of the image processing method provided in this exemplary embodiment, before processing the to-be-processed image by using the preset training model, the method may further include:

obtaining a to-be-trained image set, the to-be-trained image set including a plurality of sample images;

determining whether a sample image in the to-be-trained image set satisfies the preset image feature value extraction condition; and if the sample image satisfies the preset image feature value extraction condition, determining the sample image as the feature sample image, the feature sample image being used for training the preset training model.

In this embodiment, before processing the to-be-processed image by using the preset training model, the image processing apparatus further trains the preset training model.

Specifically, the image processing apparatus first obtains at least one to-be-trained image set. Each to-be-trained image set corresponds to a to-be-trained target input image, and each to-be-trained image set includes a plurality of sample images. The sample images are obtained after a series of calculation is performed on the target input image. Then, the image processing apparatus, determines, one by one and sequentially, whether the sample images satisfy the preset image feature value extraction condition, and determines a sample image satisfying the condition as the feature sample image. After traversing all sample images in one to-be-trained image set, the image processing apparatus performs screening on all sample images in a next to-be-trained image set. The process is continued until feature sample images in every to-be-trained image set are obtained. Then, the preset training model may be obtained by training these feature sample image.

Moreover, in this exemplary embodiment, the method in which the feature sample image is pre-selected by the image processing apparatus is described. The method mainly includes: first, obtaining the to-be-trained image set including a plurality of sample images, and then extracting, according to the preset image feature value extraction condition, a feature sample image that may be used as a training sample. These feature sample images are adequate for obtaining the preset training model. By using the foregoing method, it is limited that in the process of training the preset training model, only sample images with higher values instead of all sample images are selected to be trained. In this way, accuracy of sample training is increased, and resources for sample training are reduced, so that utility of the solution is improved.

Based on the first embodiment corresponding to FIG. 5, in a second optional embodiment of the image processing method provided in this exemplary embodiment, after the determining whether a sample image in the to-be-trained image set satisfies the preset image feature value extraction condition, the method may further include:

if the sample image does not satisfy the preset image feature value extraction condition, deleting the sample image from the to-be-trained image set.

In this embodiment, the image processing apparatus, determines, one by one and sequentially, whether the sample images satisfy the preset image feature value extraction condition, and deletes a sample image from a corresponding to-be-trained image set if the sample image does not satisfy the preset image feature value extraction condition.

After the sample image not satisfying the preset image feature value extraction condition is deleted from the to-be-trained image set, the to-be-trained image set is compressed, so that a quantity of parameters used for training is reduced, and a compression task of the preset training model is complete.

Further, in this exemplary embodiment, in the process of extracting the feature sample image according to the preset image feature value extraction condition, the image processing apparatus may further delete a sample image failed to pass screening from the to-be-trained image set. By using the foregoing method, the sample image not satisfying the requirement may be deleted from the to-be-trained image set, so that the to-be-trained image set is compressed, and calculation complexity in the sample training process is reduced and calculation resources in a network are reduced.

Based on the first embodiment corresponding to FIG. 5, in a second optional embodiment of the image processing method provided in this exemplary embodiment, the obtaining a to-be-trained image set may include:

obtaining a target input image;

performing convolution processing on the target input image by using a linear filter, and obtaining a plurality of convolution sample images; and performing calculation on the plurality of convolution sample images by using a non-linear activation function, and obtaining the plurality of sample images in the to-be-trained image set.

Figure 6:
FIG. 6 is a schematic diagram of a plurality of convolution sample images according to an exemplary embodiment.

In this embodiment, how the sample image in the to-be-trained image set is pre-processed is described. First, the image processing apparatus obtains at least one target input image. For ease of understanding, one target input image is used as an example for description. Referring to FIG. 6, FIG. 6 is a schematic diagram of a plurality of convolution sample images according to an exemplary embodiment. As shown in FIG. 6, FIG. 6 shows a feature image Ci obtained after calculation is performed on a Conv layer, that is, a convolution sample image.

A calculation formula for the Conv layer is as follows:

$$a_{i,j} = f\left(\sum_{m=0}^{2}\sum_{n=0}^{2} w_{i,j} x_{i+m,j+n} + w_b\right); \quad (1)$$

In formula (1), $x_{i,j}$ represents an element in an ith row and a jth column of the target input image. Each weight of a filter is numbered. $w_{i,j}$ represents a weight in the ith row and the jth column. $w_b$ represents a bias term of the filter. Each element of a convolution sample image is numbered. $a_{i,j}$ represents an element in an ith row and a jth column of the convolution sample image. f represents a non-linear activation function. In the present disclosure, the non-linear activation function that is used is an ReLU function. An output result on an ith Conv layer is denoted as $C_i$.

Figure 7:
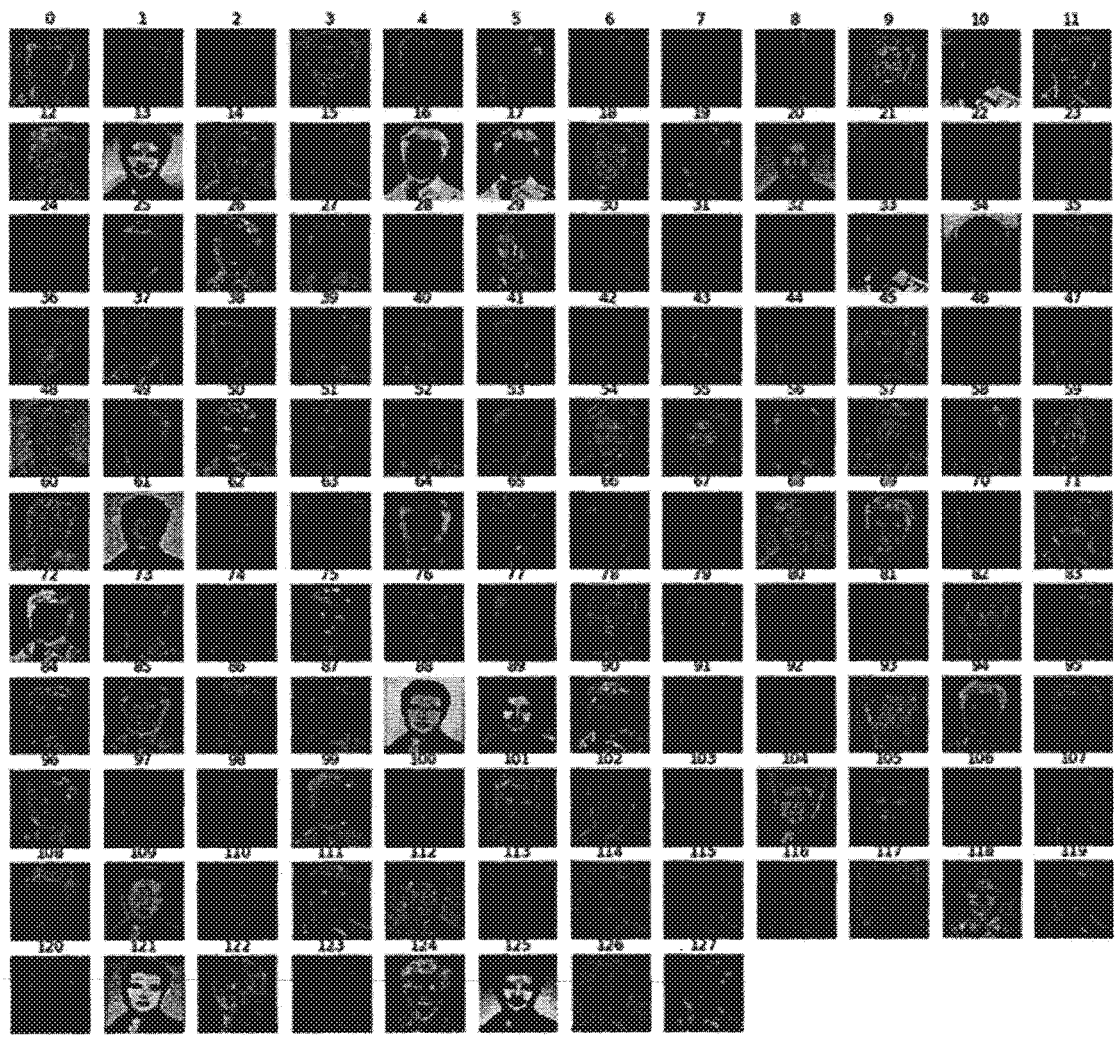
FIG. 7 is a schematic diagram of a plurality of sample images in a to-be-trained image set according to an exemplary embodiment.

After calculation is performed on the Conv layer, calculation on the ReLU layer is performed, and a schematic diagram of a plurality of sample images is obtained, as shown in FIG. 7. The sample image is specifically a feature image. The feature image may be considered as being obtained by mapping a data vector to a feature space by using a function. A plurality of linear filters is used first to perform a convolution operation on the target input image. Then a bias is added. Finally, the target input image is applied to a non-linear activation function. Referring to FIG. 7, FIG. 7 is a schematic diagram of a plurality of sample images in a to-be-trained image set according to an exemplary embodiment. A calculation formula for the ReLU layer is as follows:

$$R_j = \max(0, C_i); \quad (2)$$

In formula (2), $R_j$ represents an output result on a jth ReLU layer, that is, a sample image to be used in the present disclosure.

In FIG. 6 and FIG. 7, numerals are ranked in descending order, and corresponding feature images change from blue to red. Compared with the Conv layer, the ReLU layer may obtain all valuable activation signals through filtering because of use of the activation function, making analysis easier.

Further, in this exemplary embodiment, before training the feature sample image, the image processing apparatus further pre-processes all sample images in the to-be-trained image set, that is, the image processing apparatus first obtains at least one target input image, and sequentially performs Conv calculation and non-linear activation function calculation on the target input image, so that a plurality of sample images may be obtained. By using the foregoing method, the plurality of sample images is obtained by performing non-linear activation function calculation. The use of the non-linear activation function may obtain all valuable activation signals through filtering, making analysis easier. In addition, the non-linear activation function also has advantages such as fast in calculation speed, thereby being capable of alleviating a vanishing-gradient problem, and an activation rate has sparsity.

Based on the third embodiment corresponding to FIG. 5, in a fourth optional embodiment of the image processing method provided in this exemplary embodiment, the determining whether a sample image in the to-be-trained image set satisfies the preset image feature value extraction condition may include:

obtaining an ROI brightness value of the sample image in the to-be-trained image set; and determining whether the ROI brightness value is less than or equal to a first preset threshold, and if yes, determining that the sample image satisfies the preset image feature value extraction condition.

In this embodiment, the image processing apparatus may obtain an ROI of each sample image in at least one to-be-trained image set. The ROI of the sample image is preset by a user, and may be selected from a background of the sample image or a layer. A shape of the selected region is not limited.

Because the sample images are obtained by performing calculation on the ReLU layer, a part of an ROI, of a sample image, that is activated is searched for according to the ReLU layer. As shown in FIG. 7, a relatively bright background is activated by an ReLU function. Then, a weight and a bias of the sample image having a relatively bright background are set to 0. When the values are substituted into formula (1), it is easy to find that the sample image does not satisfy the preset image feature value extraction condition.

The determining a brightness may be specifically determining based on the first preset threshold. If the ROI brightness value is less than or equal to the first preset threshold, it is determined that the sample image satisfies the preset image feature value extraction condition. If the ROI brightness value is greater than the first preset threshold, the sample image does not satisfy the preset image feature value extraction condition and is therefore deleted. The first preset threshold is a preset brightness value and is usually determined according to a series of empirical data. The value may be manually set or may be automatically generated by a device. This is not limited herein.

Further, in this exemplary embodiment, the image processing apparatus may further pre-obtain the ROI brightness value of the sample image in the to-be-trained image set, and determine whether the preset image feature value extraction condition is satisfied according to whether the ROI brightness value is less than or equal to the first preset threshold. By using the foregoing method, a sample image is activated based on the non-linear activation function, a sample image satisfying the preset image feature value extraction condition is obtained by obtaining a brightness value of an ROI, and an ROI having a relatively high brightness is a part activated by using the non-linear activation function. This part causes an output image to be not clean enough. Therefore, such a type of sample image is not used during model training to improve a purification effect of the output image.

Based on the fourth embodiment corresponding to FIG. 5, in a fifth optional embodiment of the image processing method provided in this exemplary embodiment, the determining whether the ROI brightness value is less than or equal to a first preset threshold may include:

receiving a sample extraction instruction triggered by a user, the sample extraction instruction being used for indicating that the ROI brightness value of the sample image is less than or equal to the first preset threshold; and determining, according to the sample extraction instruction, that the ROI brightness value of the sample image is less than or equal to the first preset threshold.

In this embodiment, sample images, of the sample images, whose brightness values are less than or equal to the first preset threshold are mainly manually selected, and these sample image are feature sample images.

Figure 8:
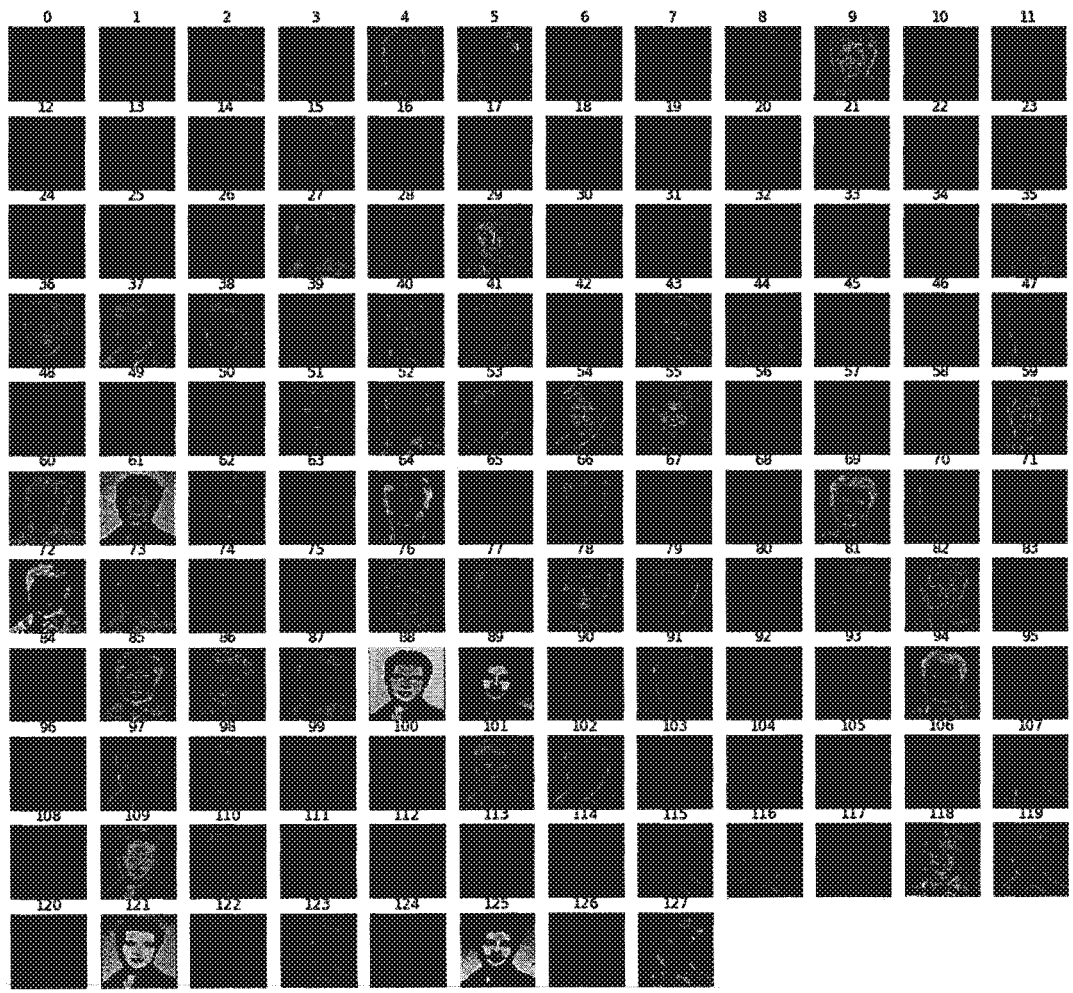
FIG. 8 is a schematic diagram of semi-automatically selecting a sample image according to an exemplary embodiment.

To ensure purification of the output background of the target image, an optimal preset training model may be obtained through training. Referring to FIG. 7 again, the user may search, one by one, the sample images obtained by performing calculation on the ReLU layer for a sample image whose background is lightened. The lightened background is an activated part, and is why an output image background is unclean. To resolve the problem, a weight $w_{i,j}$ and a bias $w_b$ of a feature image having a relatively bright background are set to 0, that is, the sample image is deleted. In this way, a quantity of parameters is reduced and the model is compressed. Sample images (for example, the 0th sample image, the first sample image and the seventh sample image) having a relatively bright background in FIG. 7 are set to 0. Finally output sample images are shown in FIG. 8. FIG. 8 is a schematic diagram of semi-automatically selecting a sample image according to an exemplary embodiment. The user manually selects a sample image whose ROI brightness value is less than or equal to the first preset threshold in FIG. 7. This triggers a sample extraction instruction, so that the image processing apparatus may determine sample images whose ROI brightness values are less than or equal to the first preset threshold according to the sample extraction instruction, that is, may determine that these sample images satisfy the preset image feature value extraction condition.

Further, in this exemplary embodiment, the manner of semi-automatically selecting a sample image is provided. The image processing apparatus receives sample images manually selected by the user, and uses the sample images as feature sample images to perform model training. By using the foregoing method, the user may select the feature sample images meeting the requirement according to the preset training model, thereby improving flexibility and feasibility of the solution.

Based on the fourth embodiment corresponding to FIG. 5, in a sixth optional embodiment of the image processing method provided in this exemplary embodiment, the determining whether the ROI brightness value is less than or equal to a first preset threshold may include:

obtaining a brightness difference between the ROI brightness value and a target ROI brightness value, the target ROI brightness value being preset; and determining whether the brightness difference is greater than or equal to a second preset threshold, and if yes, determining that the ROI brightness value is less than or equal to the first preset threshold.

Figure 9:
FIG. 9 is a schematic diagram of a target region of interest (ROI) template according to an exemplary embodiment.
Figure 9:
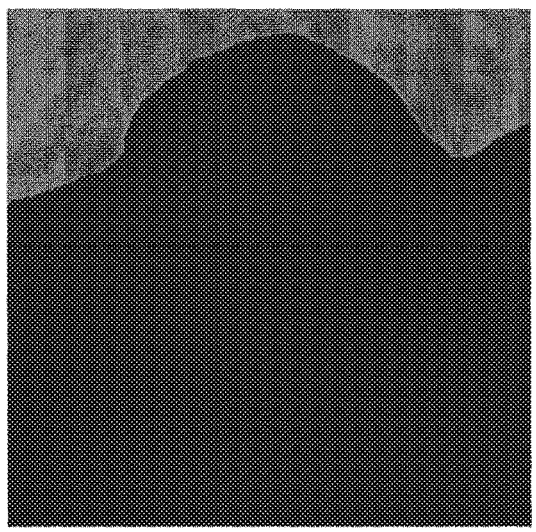

In this embodiment, when automatically selecting a feature sample image meeting the condition from the sample images, the image processing apparatus pre-selects a standard template. Referring to FIG. 9, FIG. 9 is a schematic diagram of a target ROI template according to an exemplary embodiment. A target ROI is selected in a left part of FIG. 9, that is, a region above the human face, and then a corresponding target ROI template is made. A brightness value of the target ROI template is Fm, and details are shown in a right part of FIG. 9. A preset second preset threshold is T, and an ROI brightness value of a sample image is Fn. The target ROI brightness value Fm is subtracted from the ROI brightness value Fn, so that a brightness difference D is obtained. If D is less than T, a weight and a bias of the sample image are set to 0. In this way, a task of performing automatic background purification processing and automatic compression is complete.

Figure 10:
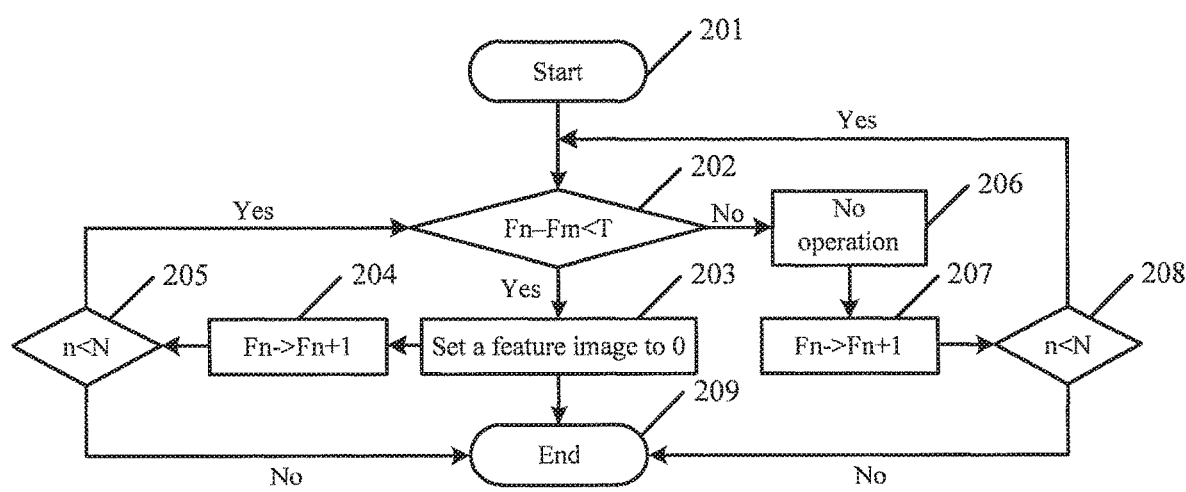
FIG. 10 is a schematic flowchart of automatically selecting a sample image according to an exemplary embodiment.

For ease of understanding, the following may describe a procedure of automatically selecting a sample image in the present disclosure in detail by using a specific application scenario. Referring to FIG. 10, FIG. 10 is a schematic flowchart of automatically selecting a sample image according to an exemplary embodiment. The procedure is specifically as follows:

Step 201: An image processing apparatus starts to automatically select a sample image from a to-be-trained image set.

Step 202: Fn represents an nth sample image on each layer, Fm represents a target ROI template corresponding to an ROI, and N represents a total quantity of sample images on the layer. First, whether Fn−Fm is less than T is determined. T is a preset second preset threshold. If yes, step 203 is performed; otherwise, jump to step 206.

Step 203: If Fn−Fm<T, a weight and a bias of the sample image Fn are set to 0.

Step 204: After the weight and the bias of the sample image Fn are set to 0, a next sample image is started to be determined, that is, when n changes to n+1, the next sample image may start to be screened.

Step 205: Determine whether n is less than N. If yes, perform step 202 to start a new round of determining and calculation. If no, jump to step 209 to complete automatic selection of a sample image.

Step 206: The image processing apparatus does not perform any operation on this sample image.

Step 207: Continue to determine a next sample image, that is, n changes to n+1, and the next sample image is start to be screened.

Step 208: Determine whether n is less than N. If yes, perform step 202 to start a new round of cyclic determining and calculation. If no, jump to step 209 to complete automatic selection of a sample image.

Step 209: The image processing apparatus ends the automatic selection of a sample image.

Further, in this exemplary embodiment, the manner of automatically selecting a sample image is provided, that is, the image processing apparatus obtains the brightness difference between the ROI brightness value and the target ROI brightness value, and determines, if the brightness difference is greater than or equal to the second preset threshold, that the sample image satisfies the preset image feature value extraction condition. By using the foregoing method, the image processing apparatus may automatically extract the feature sample image satisfying the requirement, thereby improving convenience and utility of the solution.

Figure 11:
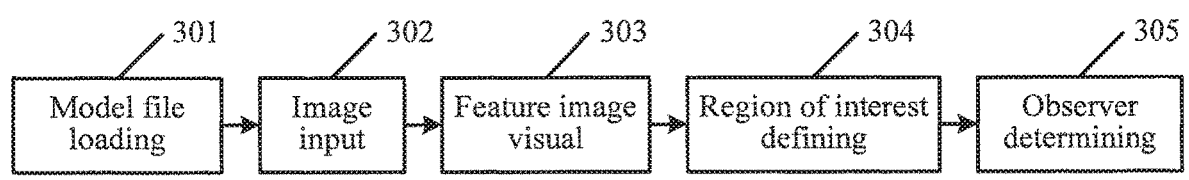
FIG. 11 is a flowchart of a feature sample image parameter adjusting module in an application scenario according to the present disclosure.

For ease of understanding, the following may further describe an image processing process in the present disclosure in detail by using a specific application scenario. This solution is mainly performing parameter adjustment based on a sample image, and setting, to 0, a weight and a bias of a sample image having a relatively great impact on a background but having no or a relatively small impact on another local feature, so that the background is purified and a quantity of parameters is reduced. Referring to FIG. 11, FIG. 11 is a flowchart of a feature sample image parameter adjusting module in an application scenario according to the present disclosure. The procedure is specifically:

A model file loading module 301 is configured to load at least one target input image from an image database. One target input image is extracted by using an image input module 302. Then, visual processing is performed on the target input image by using a feature image visual module 303. A specific processing manner is: first, calculating, by using a Conv layer, a sample image on which convolution processing is performed, and then calculating, by using an ReLU algorithm, the sample image on which convolution processing is performed, to obtain a visualized sample image. In this way, a user may select an ROI in the sample image by using an ROI defining module 304. Finally, a feature sample image meeting a requirement is selected by using an observer determining module 305 and the feature sample image is used to train a preset training model.

Figure 12:
FIG. 12 is a schematic diagram of a non-linear activation function-based visual analysis technology in an application scenario.
Figure 12:
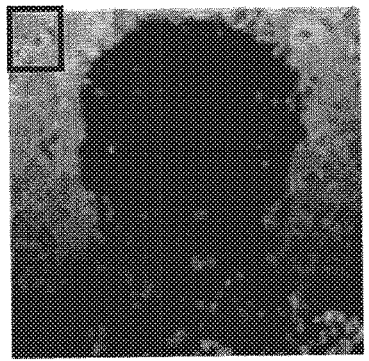
Figure 12:

The feature image visual module 303 may use a visual analysis technology based on an ReLU algorithm. Referring to FIG. 12, FIG. 12 is a schematic diagram of a non-linear activation function-based visual analysis technology in an application scenario. As shown in the figure, the visual analysis technology mainly includes four steps: ROI defining, ReLU algorithm-based searching, iteration optimization policy result generation, and observer determining. As shown in FIG. 12, a black frame represents a region of interest of an image, that is, an ROI, a middle figure shows a part of the ROI, of the sample image, that is determined based on the ReLU algorithm and that is activated. Then, a weight and a bias of the sample image are set to 0. Then, same operations are performed on a next sample image, thereby generating an optimized result.

Figure 13:
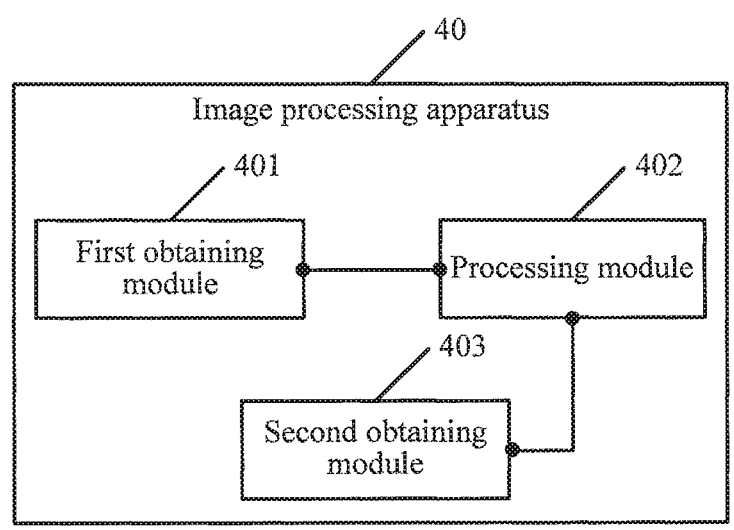
FIG. 13 is a schematic diagram of an image processing apparatus according to an exemplary embodiment.

The following describes an image processing apparatus in the present disclosure in detail. Referring to FIG. 13, an image processing apparatus in this exemplary embodiment is an image processing apparatus applied to an image processing method. The image processing apparatus 40 includes:

a first obtaining module 401, configured to obtain a to-be-processed image;

a processing module 402, configured to process, by using a preset training model, the to-be-processed image obtained by the first obtaining module 401, the preset training model being a function relationship model of a feature sample image and an activation function of the feature sample image, and the feature sample image including an image satisfying a preset image feature value extraction condition; and a second obtaining module 403, configured to obtain a target image corresponding to the to-be-processed image according to a processing result obtained by the processing module 402 by performing processing by using the preset training model.

In this embodiment, the first obtaining module 401 obtains the to-be-processed image; the processing module 402 processes, by using the preset training model, the to-be-processed image obtained by the first obtaining module 401, the preset training model being the function relationship model of the feature sample image and the activation function of the feature sample image, and the feature sample image including the image satisfying the preset image feature value extraction condition; and the second obtaining module 403 obtains the target image corresponding to the to-be-processed image according to the processing result obtained by the processing module 402 by performing processing by using the preset training model.

The image processing apparatus provided in this exemplary embodiment may implement the following functions: first, obtaining the to-be-processed image; then, processing to-be-processed image by using the preset training model, the preset training model being the function relationship model of the feature sample image and the activation function of the feature sample image, and the feature sample image including the image satisfying the preset image feature value extraction condition; finally, the image processing apparatus obtains the target image corresponding to the to-be-processed image according to the processing result of the preset training model. By using the foregoing apparatus, during model training, sample images not satisfying a preset image feature value extraction condition may be deleted, thereby effectively reducing calculation redundancy and storage space waste. In addition, due to a relatively high compression rate, such a model may be applied to an application program of a mobile terminal, thereby improving utility of the solution.

Figure 14:
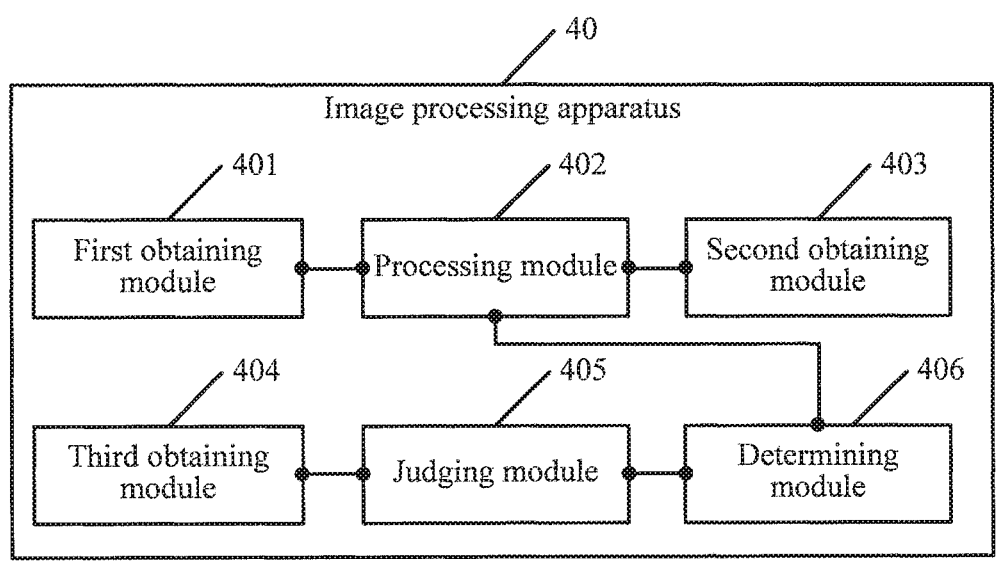
FIG. 14 is a schematic diagram of another image processing apparatus according to an exemplary embodiment.

Based on the embodiment corresponding to FIG. 13, referring to FIG. 14, FIG. 14 is a schematic diagram of another image processing apparatus according to an exemplary embodiment. In this image processing apparatus, the image processing apparatus 40 further includes:

a third obtaining module 404, configured to: before the processing module 402 processes the to-be-processed image by using the preset training model, obtain a to-be-trained image set, the to-be-trained image set including a plurality of sample images;

a judging module 405, configured to determine whether a sample image in the to-be-trained image set obtained by the third obtaining module 404 satisfies the preset image feature value extraction condition; and a determining module 406, configured to: if the judging module 405 determines that the obtained sample image satisfies the preset image feature value extraction condition, determine the sample image as the feature sample image, the feature sample image being used for training the preset training model.

Moreover, in this exemplary embodiment, the method in which the feature sample image is pre-selected by the image processing apparatus is described. The method mainly includes: first, obtaining the to-be-trained image set including a plurality of sample images, and then extracting, according to the preset image feature value extraction condition, feature sample images that may be used as training samples. These feature sample images are adequate for obtaining the preset training model. By using the foregoing method, it is limited that in the process of training the preset training model, only sample images with higher values instead of all sample images are selected to be trained. In this way, accuracy of sample training is increased, and resources for sample training are reduced, so that utility of the solution is improved.

Figure 15:
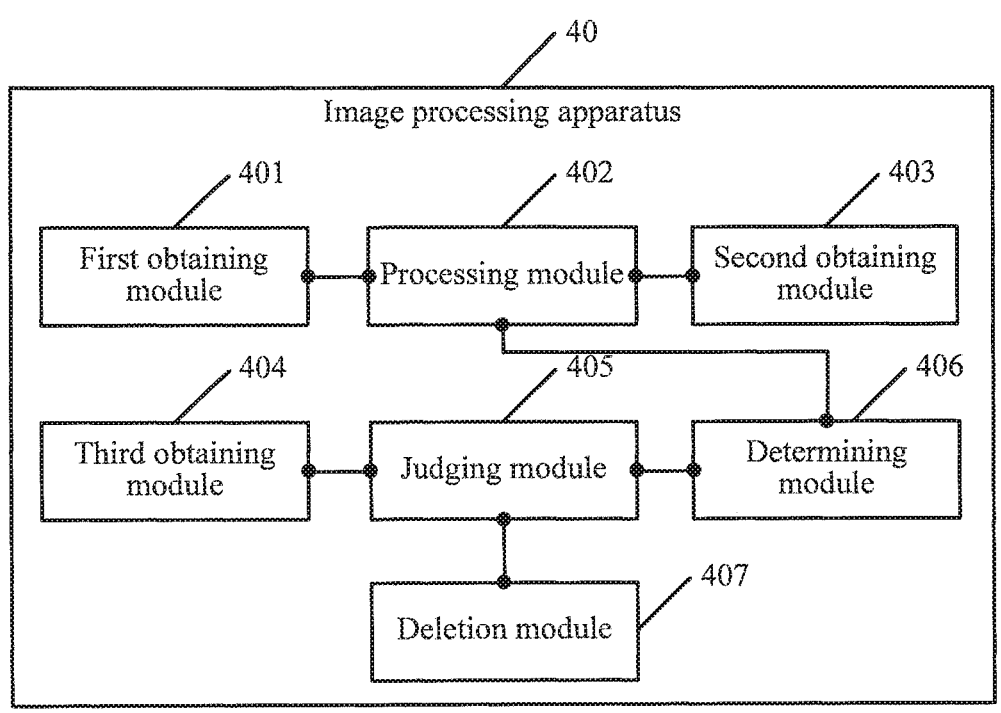
FIG. 15 is a schematic diagram of another image processing apparatus according to an exemplary embodiment.

Based on the embodiment corresponding to FIG. 14, referring to FIG. 15, FIG. 15 is a schematic diagram of another image processing apparatus according to an exemplary embodiment. As shown in FIG. 15, this image processing apparatus is based on the apparatus shown in FIG. 14, and the image processing apparatus 40 further includes:

a deletion module 407, configured to: after the judging module 405 determines whether the sample image in the to-be-trained image set satisfies the preset image feature value extraction condition, if the sample image does not satisfy the preset image feature value extraction condition, delete the sample image from the to-be-trained image set.

Further, in this exemplary embodiment, in the process of extracting the feature sample image according to the preset image feature value extraction condition, the image processing apparatus may further delete a sample image failed to pass screening from the to-be-trained image set. By using the foregoing method, the sample image not satisfying the requirement may be deleted from the to-be-trained image set, so that the to-be-trained image set is compressed, and calculation complexity in the sample training process is reduced and calculation resources in a network are reduced.

Figure 16:
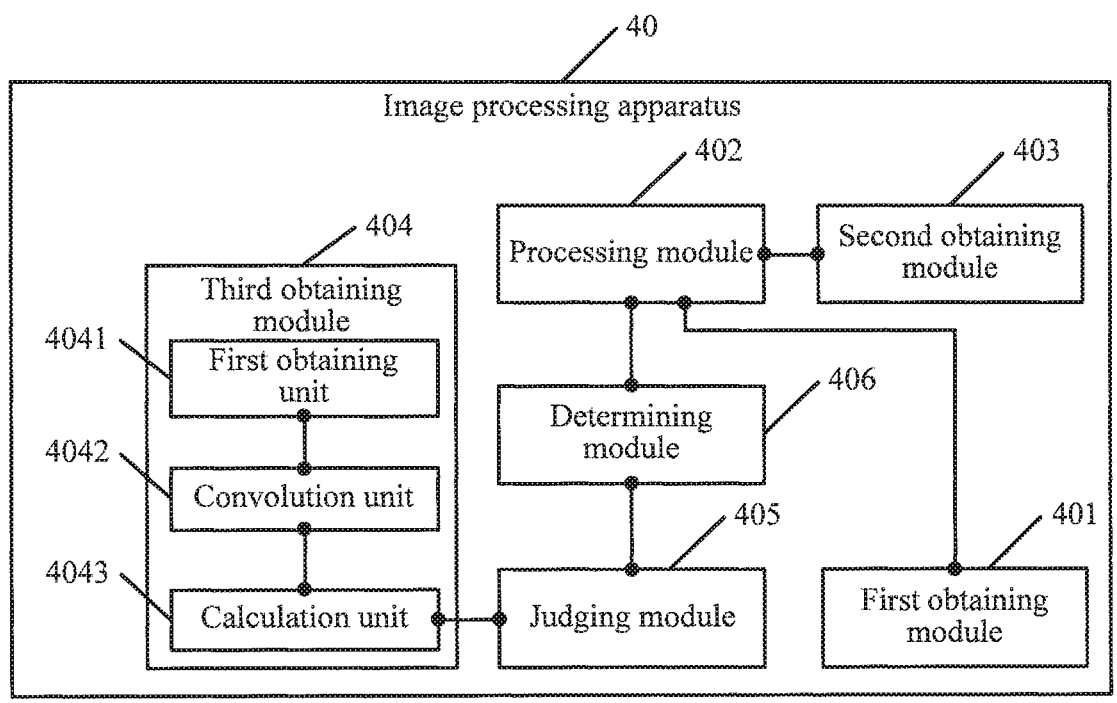
FIG. 16 is a schematic diagram of another image processing apparatus according to an exemplary embodiment.

Based on the embodiment corresponding to FIG. 14, referring to FIG. 16, FIG. 16 is a schematic diagram of another image processing apparatus according to an exemplary embodiment. In the image processing apparatus, the third obtaining module 404 includes:

a first obtaining unit 4041, configured to obtain a target input image;

a convolution unit 4042, configured to perform, by using a linear filter, convolution processing on the target input image obtained by the first obtaining unit 4041, and obtain a plurality of convolution sample images; and a calculation unit 4043, configured to use a non-linear activation function to perform calculation on the plurality of convolution sample images obtained by the convolution unit 4042 by performing the convolution processing, and obtain the plurality of sample images in the to-be-trained image set.

Further, in this exemplary embodiment, before training the feature sample image, the image processing apparatus further pre-processes all sample images in the to-be-trained image set, that is, the image processing apparatus first obtains at least one target input image, and sequentially performs Conv calculation and non-linear activation function calculation on the target input image, so that a plurality of sample images may be obtained. By using the foregoing method, the plurality of sample images is obtained by performing non-linear activation function calculation. The use of the non-linear activation function may obtain all valuable activation signals through filtering, making analysis easier. In addition, the non-linear activation function also has advantages such as fast in calculation speed, thereby being capable of alleviating a vanishing-gradient problem, and an activation rate has sparsity.

Figure 17:
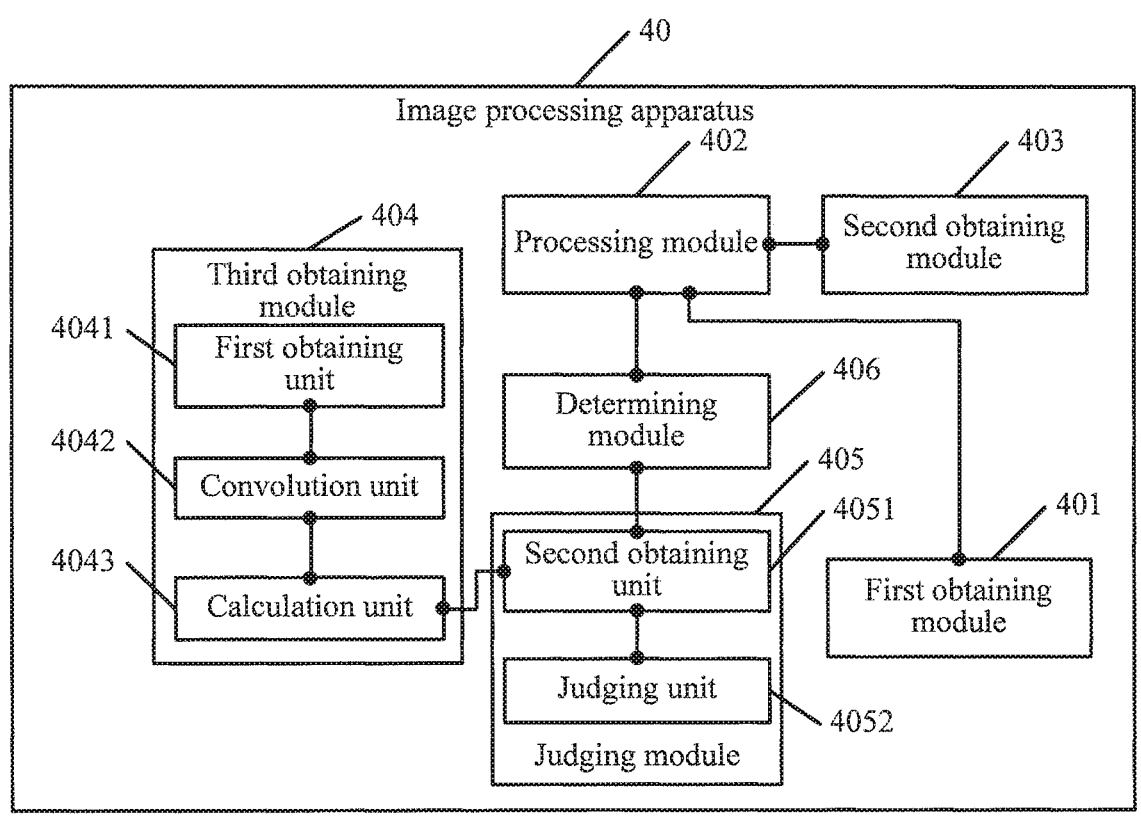
FIG. 17 is a schematic diagram of another image processing apparatus according to an exemplary embodiment.

Based on the embodiment corresponding to FIG. 16, referring to FIG. 17, FIG. 17 is a schematic diagram of another image processing apparatus according to an exemplary embodiment. In the image processing apparatus, the judging module 405 includes:

a second obtaining unit 4051, configured to obtain an ROI brightness value of the sample image in the to-be-trained image set; and a judging unit 4052, configured to determine whether the ROI brightness value obtained by the second obtaining unit 4051 is less than or equal to a first preset threshold, and if yes, determine that the sample image satisfies the preset image feature value extraction condition.

Further, in this exemplary embodiment, the image processing apparatus may further pre-obtain the ROI brightness value of the sample image in the to-be-trained image set, and determine whether the preset image feature value extraction condition is satisfied according to whether the ROI brightness value is less than or equal to the first preset threshold. By using the foregoing method, a sample image is activated based on the non-linear activation function, a sample image satisfying the preset image feature value extraction condition is obtained by obtaining a brightness value of an ROI, and an ROI having a relatively high brightness is a part activated by using the non-linear activation function. This part causes an output image to be not clean enough. Therefore, such a type of sample image is not used during model training to improve a purification effect of the output image.

Figure 18:
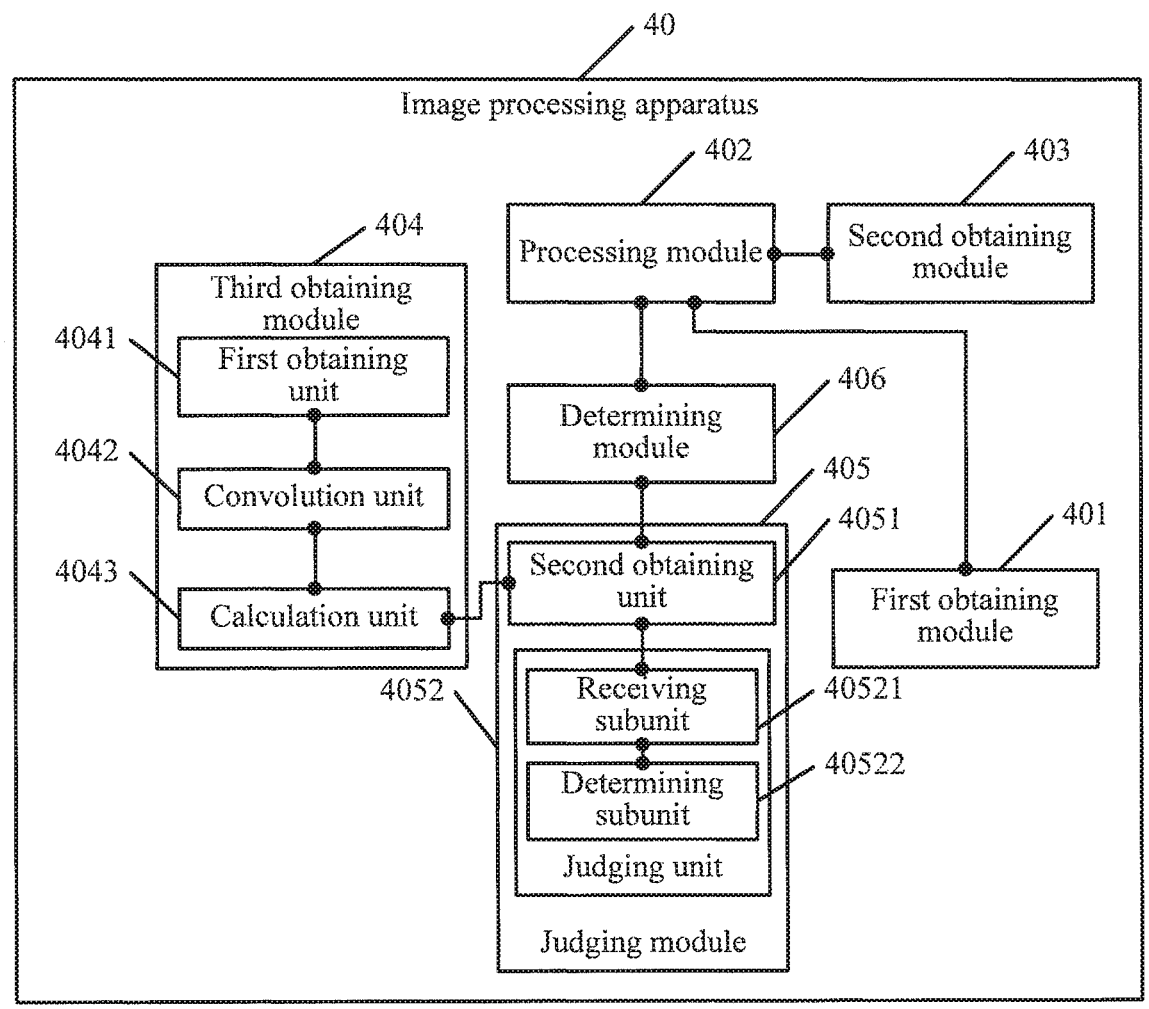
FIG. 18 is a schematic diagram of another image processing apparatus according to an exemplary embodiment.

In some exemplary embodiments, based on the embodiment corresponding to FIG. 17, referring to FIG. 18, FIG. 18 is a schematic diagram of another image processing apparatus according to an exemplary embodiment. In the image processing apparatus, the judging unit 4052 includes:

a receiving subunit 40521, configured to receive a sample extraction instruction triggered by a user, the sample extraction instruction being used for indicating that the ROI brightness value of the sample image is less than or equal to the first preset threshold; and a determining subunit 40522, configured to determine, according to the sample extraction instruction received by the receiving subunit 40521, that the ROI brightness value of the sample image is less than or equal to the first preset threshold.

Further, in this exemplary embodiment, the image processing apparatus receives sample images manually selected by the user, and uses the sample images as feature sample images to perform model training. By using the foregoing method, the user may select the feature sample images meeting the requirement according to the preset training model, thereby improving flexibility and feasibility of the solution.

Figure 19:
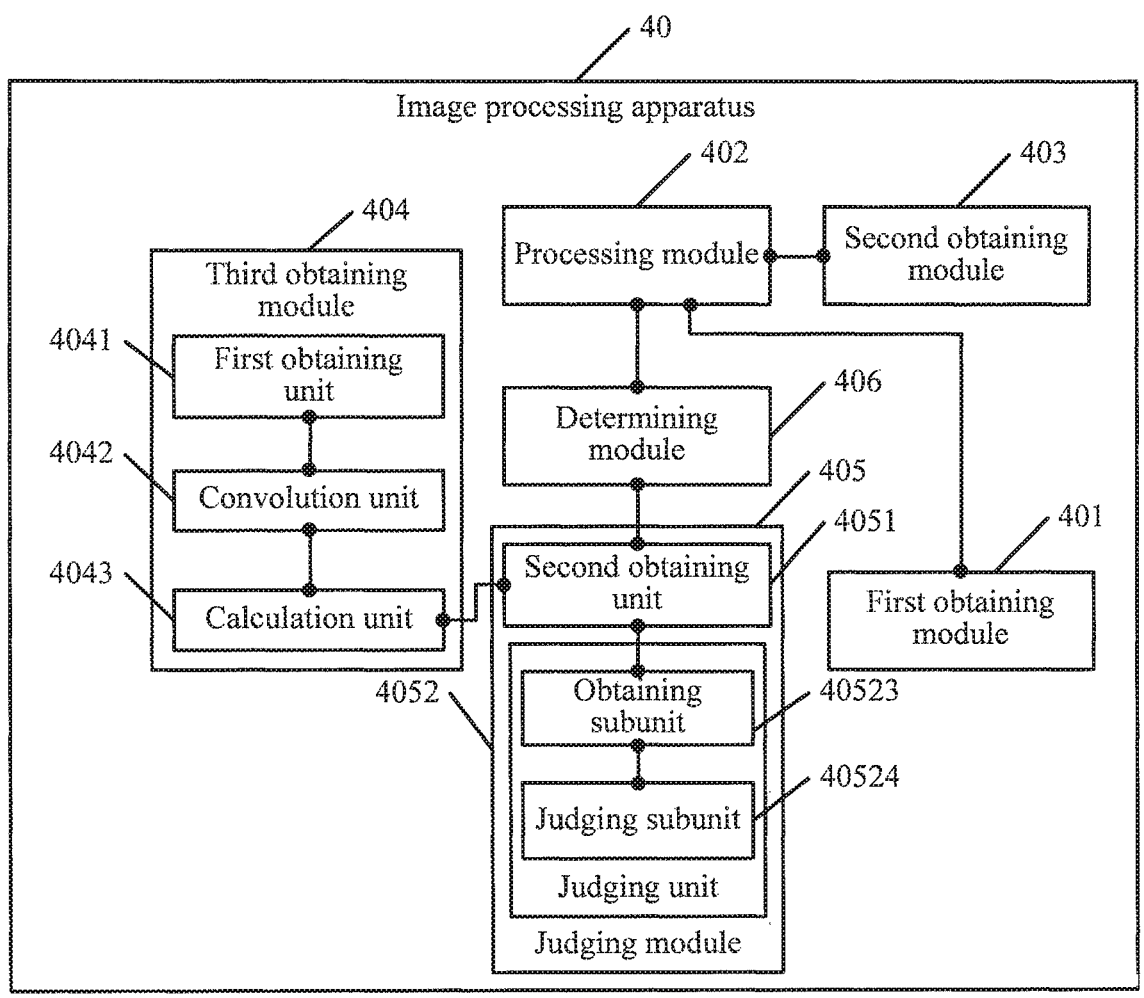
FIG. 19 is a schematic diagram of another image processing apparatus according to an exemplary embodiment.

In some exemplary embodiments, based on the embodiment corresponding to FIG. 17, referring to FIG. 19, FIG. 19 is a schematic diagram of another image processing apparatus according to an exemplary embodiment. In the image processing apparatus, the judging unit 4052 includes:

an obtaining subunit 40523, configured to obtain a brightness difference between the ROI brightness value and a target ROI brightness value, the target ROI brightness value being preset; and a judging subunit 40524, configured to determine whether the brightness difference obtained by the obtaining subunit 40523 is greater than or equal to a second preset threshold, and if yes, determine that the ROI brightness value is less than or equal to the first preset threshold.

Further, in this exemplary embodiment, the manner of automatically selecting a sample image is provided, that is, the image processing apparatus obtains the brightness difference between the ROI brightness value and the target ROI brightness value, and determines, if the brightness difference is greater than or equal to the second preset threshold, that the sample image satisfies the preset image feature value extraction condition. By using the foregoing method, the image processing apparatus may automatically extract the feature sample image satisfying the requirement, thereby improving convenience and utility of the solution.

In addition, the present disclosure further provides an image processing apparatus. The apparatus includes:

a processor and a memory, the memory being configured to store program code and transmit the program code to the processor; and the processor being configured to perform, according to instructions in the program code, the image processing method in the foregoing method embodiment of FIG. 5.

In addition, an exemplary embodiment further provides a storage medium. The storage medium is configured to store program code, the program code being used for performing the image processing method in the foregoing method embodiment of FIG. 5.

According to another aspect, an exemplary embodiment further provides a computer program product including instructions, the instructions, when run on a computer, causing the computer to perform the image processing method in the foregoing method embodiment of FIG. 5.

Figure 20:
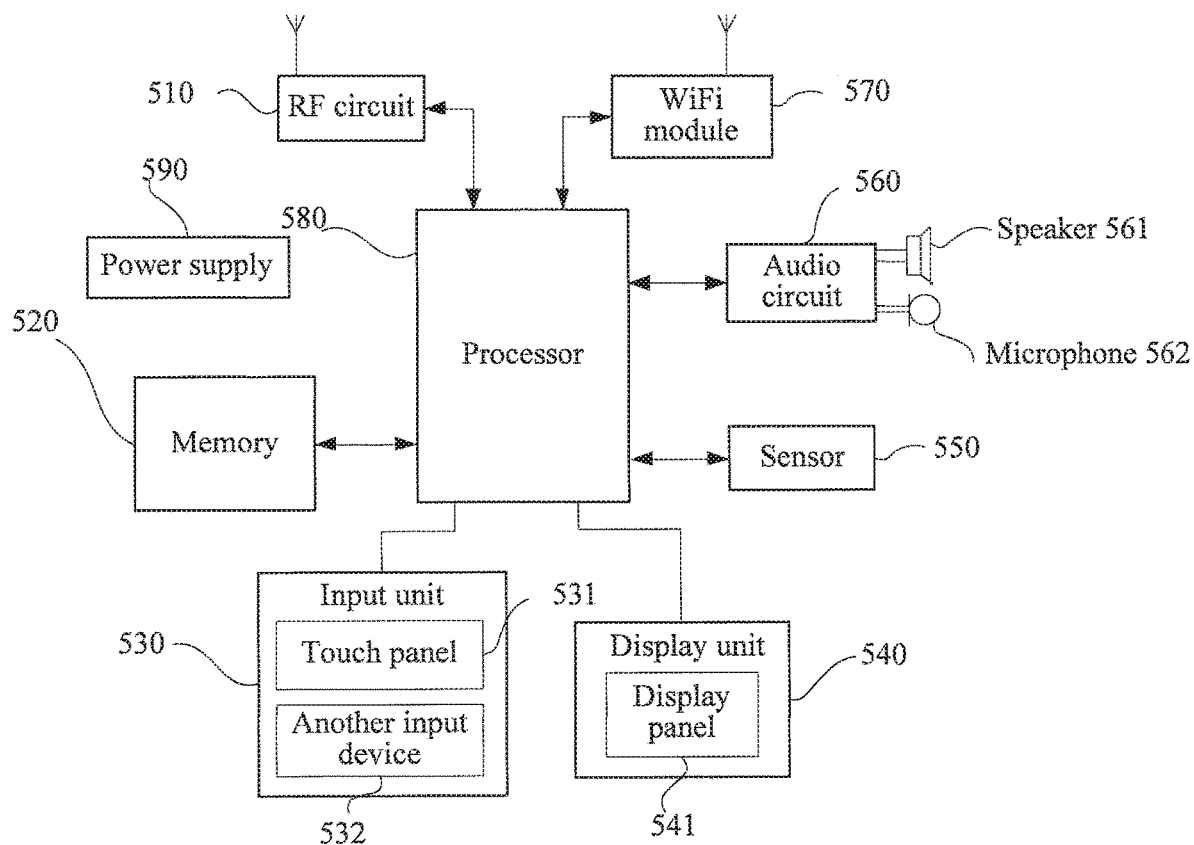
FIG. 20 is a schematic structural diagram of an image processing apparatus according to an exemplary embodiment.

An exemplary embodiment further provides another image processing apparatus, as shown in FIG. 20. For ease of description, only parts related to this exemplary embodiment are shown. For technical details that are not disclosed, refer to the method exemplary embodiments. The image processing apparatus may be any terminal device such as a mobile phone, a tablet computer, a personal digital assistant (PDA), a point of sales (POS), or an in-vehicle computer. A hardware structure of the image processing apparatus provided in this exemplary embodiment is described by using a mobile phone as an example.

FIG. 20 is a block diagram of a part of a structure of the image processing apparatus according to this exemplary embodiment. Referring to FIG. 20, the mobile phone includes components such as a radio frequency (RF) circuit 510, a memory 520, an input unit 530, a display unit 540, a sensor 550, an audio circuit 560, a wireless fidelity (WiFi) module 570, a processor 580, and a power supply 590. Persons skilled in the art may understand that the structure of the mobile phone shown in FIG. 20 does not constitute a limitation to the image processing apparatus, and the mobile phone may include more components or fewer components than those shown in the figure, or some components may be combined, or a different component deployment may be used.

The following describes the components of the mobile phone with reference to FIG. 20 in detail.

The RF circuit 510 may be configured to receive and send a signal in an information receiving and sending process or a call process. Specifically, the RF circuit receives downlink information from a base station, then delivers the downlink information to the processor 580 for processing, and sends uplink data to the base station. Generally, the RF circuit 510 includes, but is not limited to, an antenna, at least one amplifier, a transceiver, a coupler, a low noise amplifier (LNA), a duplexer, and the like. In addition, the RF circuit 510 may also communicate with a network and another device by wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 520 may be configured to store a software program and module. The processor 580 runs the software program and module stored in the memory 520, to implement various functional applications and data processing of the mobile phone. The memory 520 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 520 may include a high speed random access memory, and may further include a non-volatile memory, such as at least one magnetic disk storage device, a flash memory, or other volatile solid-state storage devices.

The input unit 530 may be configured to receive input digit or character information, and generate a keyboard signal input related to user setting and function control of the mobile phone. Specifically, the input unit 530 may include a touch panel 531 and another input device 532. The touch panel 531 may also be referred to as a touchscreen, and may collect a touch operation of a user on or near the touch panel (such as an operation of the user on or near the touch panel 531 by using any suitable object or attachment, such as a finger or a stylus), and drive a corresponding connection apparatus according to a preset program. In some exemplary embodiments, the touch panel 531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 580. Moreover, the touch controller may receive and execute a command from the processor 580. In addition, the touch panel 531 may be a resistive, capacitive, infrared, or surface sound wave type touch panel. In addition to the touch panel 531, the input unit 530 may further include the another input device 532. Specifically, the another input device 532 may include, but is not limited to: one or more of a physical keyboard, a functional key (such as a volume control key or a switch key), a track ball, a mouse, and a joystick.

The display unit 540 may be configured to display information entered by the user or information provided for the user, and various menus of the mobile phone. The display unit 540 may include a display panel 541. In some exemplary embodiments, the display panel 541 may be configured by using a liquid crystal display LCD, an organic light-emitting diode (OLED), or the like. Further, the touch panel 531 may cover the display panel 541. After detecting a touch operation on or near the touch panel 531, the touch panel 531 transfers the touch operation to the processor 580, so as to determine a type of a touch event. Then, the processor 580 provides corresponding visual output on the display panel 541 according to the type of the touch event. Although, in FIG. 20, the touch panel 531 and the display panel 541 are used as two separate parts to implement input and output functions of the mobile phone, in some embodiments, the touch panel 531 and the display panel 541 may be integrated to implement the input and output functions of the mobile phone.

The mobile phone may further include at least one sensor 550 such as an optical sensor, a motion sensor, and other sensors. Specifically, the optical sensor may include an ambient light sensor and a proximity sensor. The ambient light sensor may adjust luminance of the display panel 541 according to brightness of the ambient light. The proximity sensor may switch off the display panel 541 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 560, a speaker 561, and a microphone 562 may provide audio interfaces between the user and the mobile phone. The audio circuit 560 may convert received audio data into an electric signal and transmit the electric signal to the speaker 561. The speaker 561 converts the electric signal into a sound signal for output. On the other hand, the microphone 562 converts a collected sound signal into an electric signal. The audio circuit 560 receives the electric signal and converts the electric signal into audio data, and outputs the audio data to the processor 580 for processing. Then, the processor 580 sends the audio data to, for example, another mobile phone by using the RF circuit 510, or outputs the audio data to the memory 520 for further processing.

WiFi belongs to a short-range wireless transmission technology. Using the WiFi module 570, the mobile phone may help a user receive and send an email, browse a web page, access streaming media, and the like. The WiFi module provides wireless broadband Internet access for a user. Although FIG. 20 shows the WiFi module 570, it may be understood that, the WiFi module does not belong to a necessary constitution of the terminal device, and may be ignored according to a requirement within the scope of the essence of the present disclosure.

The processor 580 is the control center of the mobile phone, and is connected to all parts of the mobile phone by using various interfaces and lines. By running or executing the software program and/or module stored in the memory 520, and invoking data stored in the memory 520, the processor 580 performs various functions and data processing of the mobile phone, thereby performing overall monitoring on the mobile phone. In some exemplary embodiments, the processor 580 may include one or more processing units. In some exemplary embodiments, the processor 580 may integrate an application processor and a modem processor. The application processor mainly processes an operating system, a user interface, an application program, and the like. The modem processor mainly processes wireless communication. It may be understood that the foregoing modem processor may alternatively not be integrated into the processor 580.

The mobile phone further includes the power supply 590 (such as a battery) for supplying power to the components. In some exemplary embodiments, the power supply may be logically connected to the processor 580 by using a power management system, thereby implementing functions such as charging, discharging and power consumption management by using the power management system.

Although not shown in the figure, the mobile phone may further include a camera, a Bluetooth module, and the like. This is not further described herein.

In this exemplary embodiment, the processor 580 included in the terminal further has the following functions:
obtaining a to-be-processed image;
processing the to-be-processed image by using a preset training model, the preset training model being a function relationship model of a feature sample image and an activation function of the feature sample image, and the feature sample image including an image satisfying a preset image feature value extraction condition; and
obtaining a target image corresponding to the to-be-processed image according to a processing result of the preset training model.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and there may be other division manners during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the exemplary embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the existing technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the exemplary embodiments. The foregoing storage medium includes: any medium that may store program code, such as a USB flash drive, a removable hard disk, a read-only memory (ROM), a random access memory (RAM), a magnetic disk, or an optical disc.

In the present disclosure, the terms "first", "second", "third", and so on are intended to distinguish between similar objects rather than describe a specific order. It should be understood that the data termed in such a way may be interchangeable in proper circumstances, so that the exemplary embodiments described herein may be implemented in orders other than the order illustrated or described herein. Moreover, the terms "include", "contain" and any other variants mean to cover the non-exclusive inclusion. For example, a process, method, system, product, or device that includes a list of steps or units is not necessarily limited to those steps or units expressly listed, but may include other steps or units not expressly listed or inherent to such a process, method, product, or device.

The foregoing embodiments are merely intended for describing the technical solutions of the present disclosure, and not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the exemplary embodiments and the appended claims.

What is claimed is:

1. A method comprising:
obtaining, by an image processing apparatus, an image;
processing, by the image processing apparatus, the image using a preset training model that is a function relationship model of a feature sample image and an activation function of the feature sample image, the feature sample image comprising an image satisfying an image feature value extraction condition; and
obtaining, by the image processing apparatus, a target image corresponding to the image according to a processing result of the preset training model,
wherein the preset training model is trained using a training image set that is screened to remove one or more sample images that do not satisfy the image feature value extraction condition, the image feature value extraction condition being a condition that a region of interest (ROI) in a sample image has a brightness value that is less than or equal to a first threshold.

2. The method according to claim 1, further comprising:
obtaining an image set comprising a plurality of sample images;
determining whether a sample image in the image set satisfies the image feature value extraction condition; and
determining the sample image that satisfies the image feature value extraction condition as the feature sample image, wherein the feature sample image is used for training the preset training model.

3. The method according to claim 2, further comprising deleting the sample image that does not satisfy the image feature value extraction condition from the image set.

4. The method according to claim 2, wherein the obtaining the image set comprises:
obtaining a target input image;
performing convolution processing on the target input image using a linear filter, and obtaining a plurality of convolution sample images; and
performing a calculation on the plurality of convolution sample images using a non-linear activation function, and obtaining the plurality of sample images in the image set.

5. The method according to claim 2, wherein the determining whether the sample image satisfies the image feature value extraction condition comprises:
obtaining a region of interest (ROI) brightness value of the sample image in the image set; and
determining that the sample image satisfies the image feature value extraction condition based on the ROI brightness value being less than or equal to the first threshold.

6. The method according to claim 5, wherein the determining whether the sample image satisfies the image feature value extraction condition further comprises:
receiving a sample extraction instruction triggered by a user, the sample extraction instruction being used for indicating that the ROI brightness value of the sample image is less than or equal to the first threshold; and
determining, according to the sample extraction instruction, that the ROI brightness value of the sample image is less than or equal to the first threshold.

7. The method according to claim 5, wherein the determining whether the sample image satisfies the image feature value extraction condition further comprises:
obtaining a brightness difference between the ROI brightness value and a target ROI brightness value, the target ROI brightness value being preset; and
determining that the ROI brightness value is less than or equal to the first threshold based on the brightness difference being greater than or equal to a second threshold.

8. The method according to claim 1, wherein the preset training model comprises three convolution layers, two residual layers, and three deconvolution layers.

9. An apparatus comprising:
at least one memory configured to store computer program code; and
at least one processor configured to access the at least one memory and operate according to the computer program code, the computer program code including:
first obtaining code configured to cause at least one of the at least one processor to obtain an image;
processing code configured to cause at least one of the at least one processor to process the image using a preset training model that is a function relationship model of a feature sample image and an activation function of the feature sample image, the feature sample image comprising an image satisfying an image feature value extraction condition; and
second obtaining code configured to cause at least one of the at least one processor to obtain a target image corresponding to the image according to a processing result of the preset training model,
wherein the preset training model is trained using a training image set that is screened to remove one or more sample images that do not satisfy the image feature value extraction condition, the image feature value extraction condition being a condition that a region of interest (ROI) in a sample image has a brightness value that is less than or equal to a first threshold.

10. The apparatus according to claim 9, wherein the computer program code further comprises:
third obtaining code configured to cause at least one of the at least one processor to obtain an image set comprising a plurality of sample images;
first determining code configured to cause at least one of the at least one processor to determine whether a sample image in the image set satisfies the image feature value extraction condition; and
second determining code configured to cause at least one of the at least one processor to determine the sample image that satisfies the image feature value extraction condition as the feature sample image, wherein the feature sample image is used for training the preset training model.

11. The apparatus according to claim 10, wherein the second determining code is further configured to cause the at least one of the at least one processor to delete the sample image that does not satisfy the image feature value extraction condition from the image set.

12. The apparatus according to claim 10, wherein the third obtaining code comprises:
  obtaining subcode configured to cause at least one of the at least one processor to obtain a target input image;
  convolution code configured to cause at least one of the at least one processor to perform convolution processing on the target input image using a linear filter, and obtain a plurality of convolution sample images; and
  calculation code configured to cause at least one of the at least one processor to perform a calculation on the plurality of convolution sample images using a non-linear activation function, and obtain the plurality of sample images in the image set.

13. The apparatus according to claim 10, wherein the first determining code comprises:
  fourth obtaining code configured to cause at least one of the at least one processor to obtain a region of interest (ROI) brightness value of the sample image in the image set; and
  determining subcode configured to cause at least one of the at least one processor to determine that the sample image satisfies the image feature value extraction condition based on the ROI brightness value being less than or equal to the first threshold.

14. The apparatus according to claim 13, wherein the determining subcode comprises:
  receiving code configured to cause at least one of the at least one processor to receive a sample extraction instruction triggered by a user, the sample extraction instruction being used for indicating that the ROI brightness value of the sample image is less than or equal to the first threshold,
  wherein the determining subcode is configured to cause the at least one of the at least one processor to determine, according to the sample extraction instruction, that the ROI brightness value of the sample image is less than or equal to the first threshold.

15. The apparatus according to claim 13, wherein the determining subcode comprises:
  fifth obtaining code configured to cause at least one of the at least one processor to obtain a brightness difference between the ROI brightness value and a target ROI brightness value, the target ROI brightness value being preset,
  wherein the determining subcode is configured to cause the at least one of the at least one determine that the ROI brightness value is less than or equal to the first threshold based on the brightness difference being greater than or equal to a second threshold.

16. The apparatus according to claim 9, wherein the preset training model comprises three convolution layers, two residual layers, and three deconvolution layers.

17. A non-transitory computer readable storage medium storing computer program code which, when executed by a processor, configures the processor to perform:
  obtaining an image;
  processing the image using a preset training model that is a function relationship model of a feature sample image and an activation function of the feature sample image, the feature sample image comprising an image satisfying an image feature value extraction condition; and
  obtaining a target image corresponding to the image according to a processing result of the preset training model,
  wherein the preset training model is trained using a training image set that is screened to remove one or more sample images that do not satisfy the image feature value extraction condition, the image feature value extraction condition being a condition that a region of interest (ROI) in a sample image has a brightness value that is less than or equal to a first threshold.

18. The non-transitory computer readable storage medium according to claim 17, wherein the computer program code further configures the processor to perform:
  obtaining an image set comprising a plurality of sample images;
  determining whether a sample image in the image set satisfies the image feature value extraction condition; and
  determining the sample image that satisfies the image feature value extraction condition as the feature sample image, wherein the feature sample image is used for training the preset training model.

19. The non-transitory computer readable storage medium according to claim 18, wherein the computer program code further configures the processor to perform:
  deleting the sample image that does not satisfy the image feature value extraction condition from the image set.

20. The non-transitory computer readable storage medium according to claim 18, wherein the obtaining the image set comprises:
  obtaining a target input image;
  performing convolution processing on the target input image using a linear filter, and obtaining a plurality of convolution sample images; and
  performing a calculation on the plurality of convolution sample images using a non-linear activation function, and obtaining the plurality of sample images in the image set.

* * * * *